United States Patent
Zhang

(10) Patent No.: US 12,486,991 B2
(45) Date of Patent: Dec. 2, 2025

(54) FILTER SUPPORTING ASSEMBLY AND AIR CONDITIONING SYSTEM

(71) Applicant: Carrier Corporation, Palm Beach Gardens, FL (US)

(72) Inventor: Wenxiao Zhang, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 290 days.

(21) Appl. No.: 18/318,229

(22) Filed: May 16, 2023

(65) Prior Publication Data

US 2024/0019144 A1   Jan. 18, 2024

(51) Int. Cl.
| | |
|---|---|
| F24F 8/10 | (2021.01) |
| B01D 29/00 | (2006.01) |
| B01D 50/00 | (2022.01) |
| F24F 7/003 | (2021.01) |
| F24F 8/108 | (2021.01) |

(52) U.S. Cl.
CPC .............. *F24F 8/108* (2021.01); *B01D 29/00* (2013.01); *B01D 50/00* (2013.01); *F24F 7/003* (2021.01); *B01D 2201/0415* (2013.01)

(58) Field of Classification Search
CPC ................. F24F 8/108; B01D 50/00
See application file for complete search history.

(56) References Cited

U.S. PATENT DOCUMENTS

| | | |
|---|---|---|
| 4,827,901 A | 5/1989 | Jackson et al. |
| 2002/0194824 A1 | 12/2002 | Clayton et al. |
| 2005/0204713 A1 | 9/2005 | Wu et al. |

FOREIGN PATENT DOCUMENTS

CN    103453650 B  *  8/2015

OTHER PUBLICATIONS

Extended European Search Report received for EP Application No. 23174660.3, mailed on Oct. 9, 2023, 8 Pages.

* cited by examiner

*Primary Examiner* — Robert A Hopkins
(74) *Attorney, Agent, or Firm* — Drew Folgmann

(57) ABSTRACT

A filter screen supporting assembly comprises: a substrate and a support plate, wherein the first side of the support plate is pivotally connected to the substrate, and the second side of the support plate is detachably connected to the substrate, so that the support plate fills at least a part of the slot of the substrate to support the filter screen; wherein, the substrate and/or the support plate are provided with additional supporting piece, such that after a connection between the second side of the support plate and the substrate is removed when the filter screen is replaced, the support plate is supported by the additional supporting piece so that the support plate retains its support for the filter screen, and after the support from the additional supporting piece is removed, the support plate pivots to allow the filter screen to pass through the slot.

10 Claims, 6 Drawing Sheets

FILTER SUPPORTING ASSEMBLY AND AIR CONDITIONING SYSTEM

CROSS REFERENCE TO RELATED APPLICATIONS

This application claims priority to Chinese Patent Application No. 202221211682.7 filed on May 20, 2022.

FIELD OF THE INVENTION

The present invention relates to the field of air conditioning, in particular to a filter screen supporting assembly in an air outlet or ventilation duct of an air conditioning system.

BACKGROUND OF THE INVENTION

Filter screens are often installed in air conditioning systems, especially in the air outlets or ventilation ducts of central air conditioners. Filter screens need to be cleaned or replaced after a long period of use. For the lateral air outlet at the roof, the filter screen is supported by a base plate, so the filter screen can be pulled out and replaced by removing the base plate. However, the base plate is usually secured by several bolts, which need to be removed one by one during disassembly. When the bolts are removed, both the filter screen and the base plate will lose support, so it is also necessary to protect the base plate and the filter screen from falling down when removing the bolts, which is difficult for the operator. In case of improper operation, the base plate and the filter screen will fall down, which is a potential safety hazard.

SUMMARY OF THE INVENTION

The object of the present application is to solve or at least alleviate the problems existing in the prior art.

According to one aspect, a filter screen supporting assembly is provided, comprising:
  a substrate having a slot allowing a filter screen to pass through;
  a support plate having a first side and a second side, wherein the first side of the support plate is pivotally connected to the substrate at a first side of the slot of the substrate, and the second side of the support plate is detachably connected to the substrate at a second side of the slot of the substrate, so that the support plate fills at least a part of the slot of the substrate to support the filter screen;
  wherein, the substrate and/or the support plate are provided with additional supporting piece, such that after a connection between the second side of the support plate and the substrate is removed during the replacement of the filter screen, the support plate is supported by the additional supporting piece so that the support plate retains its support for the filter screen, and after the support from the additional supporting piece is removed, the support plate pivots to allow the filter screen to pass through the slot.

Optionally, in the filter screen supporting assembly, the second side of the support plate is detachably connected to the second side of the slot of the substrate through a plurality of bolts distributed along a length direction.

Optionally, in the filter screen supporting assembly, after the connection between the second side of the support plate and the substrate is removed, the support plate pivots around its connection to the first side of the slot of the substrate to a first angle position so as to be supported by the additional supporting piece, such that the support plate retains its support for the filter screen, and after the support from the additional supporting piece is removed, the support plate continues to pivot to a second angle position to allow the filter screen to pass through the slot.

Optionally, in the filter screen supporting assembly, the additional supporting piece are a plurality of hooks distributed along a length direction on the second side of the support plate, wherein, when the support plate is at the first angle position, the plurality of hooks contact and abut against the substrate to support the support plate at the first angle position, where the support plate pivots by an angle of less than 60 degrees to the first position.

Optionally, in the filter screen supporting assembly, the support plate is translating in the length direction, such that the plurality of hooks are offset from the portions on the substrate that engaged with the plurality of hooks, thereby removing the support from the additional supporting piece to allow the support plate to pivot to a second angle position, where the support plate is naturally hanging at the second angle position.

Optionally, in the filter screen supporting assembly, the support plate comprises a support plate body, wherein the plurality of hooks, which are formed by bending twice, are formed on a second side of the support plate body, and a plurality of protrusion perpendicular to the support plate body are formed on a first side of the support plate body, the plurality of protrusion having transverse extensions extending in the length direction. The substrate comprises a series of openings corresponding to the plurality of hooks on the second side of the slot and a series of notches corresponding to the plurality of protrusion on the first side of the slot to allow the support plate to be inserted into the substrate vertically from the bottom up and to be translated in the length direction, so that the transverse extensions of the plurality of protrusion are offset from the series of notches so as to be supported by the substrate, and the plurality of hooks are no longer aligned with the series of openings such that the substrate are in contact with the plurality of hooks when the support plate is at the first angle position illustrated.

Optionally, in the filter screen supporting assembly, the substrate has a limit protrusion at the first side of the slot on a surface opposite to the support plate to limit the filter screen at a first side of the filter screen, and the hooks limit the filter screen at a second side of the filter screen when the support plate is assembled in place.

Optionally, in the filter screen supporting assembly, the first side of the support plate is pivotally connected to the substrate by hinges or pins.

Optionally, in the filter screen supporting assembly, the additional supporting pieces are hooks formed on the substrate or chains or ropes formed between the substrate and the support plate.

Optionally, in the filter screen supporting assembly, the substrate comprises a single slot or a plurality of slots corresponding to a plurality of filter screens, where a separate support plate is provided for each filter screen.

An air conditioning system is further provided, where a filter screen and a filter screen supporting assembly according to the various embodiments are provided in the air outlet or ventilation duct of the air conditioning system.

The filter screen supporting assembly according to the present invention makes it easy for filter screen replacement.

BRIEF DESCRIPTION OF THE DRAWINGS

With reference to the accompanying drawings, the disclosure of the present application will become easier to understand. Those skilled in the art would easily understand that these drawings are for the purpose of illustration and are not intended to limit the protection scope of the present application. In addition, in the figures, similar numerals are used to denote similar components, where.

DETAILED DESCRIPTION OF EMBODIMENT(S) OF THE INVENTION

Figure 7:
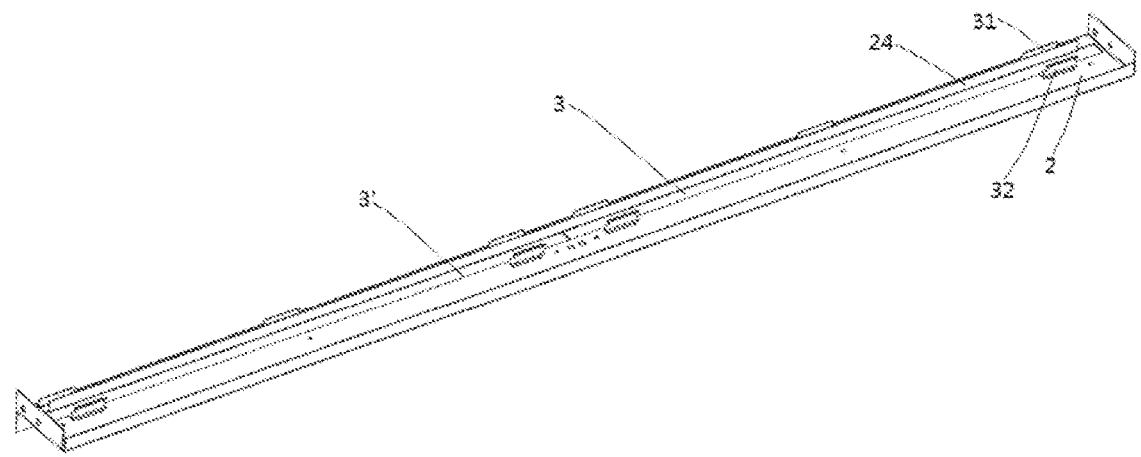
FIG. 7 shows a perspective view of assembling the substrate and the support plate according to an embodiment when viewed from above.
Figure 8:
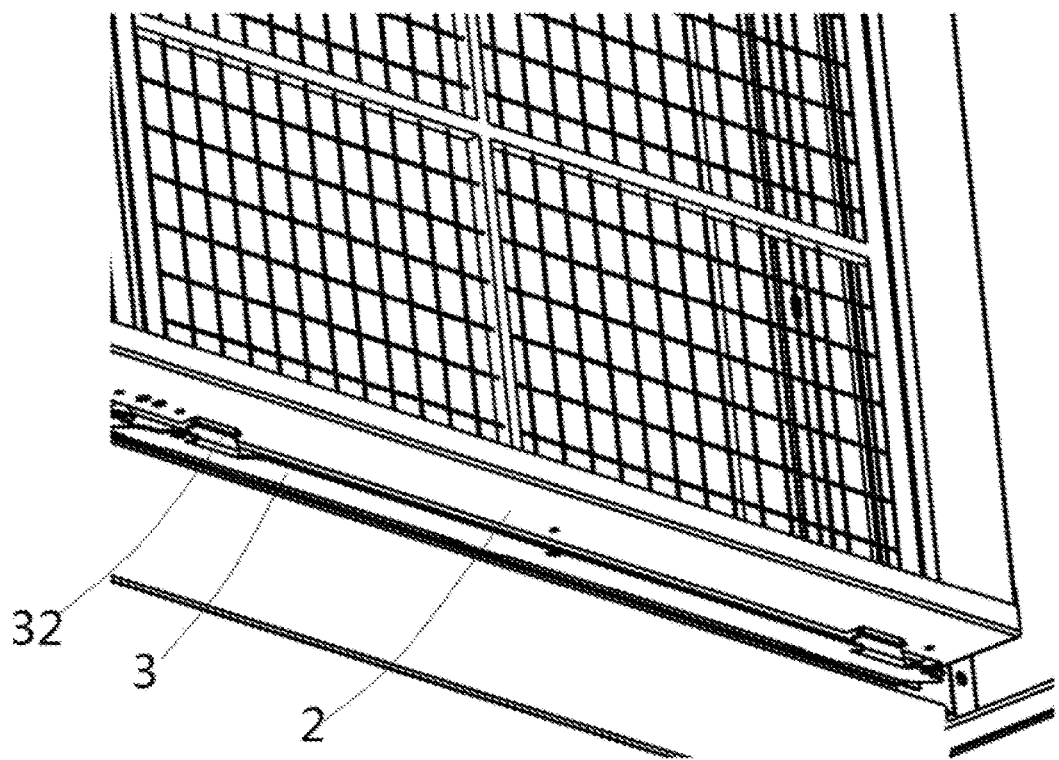
FIGS. 8 and 9 show, respectively, locally enlarged perspective views of a support plate for an air outlet according to the embodiment when viewed from above and below at a first angle position.
Figure 9:
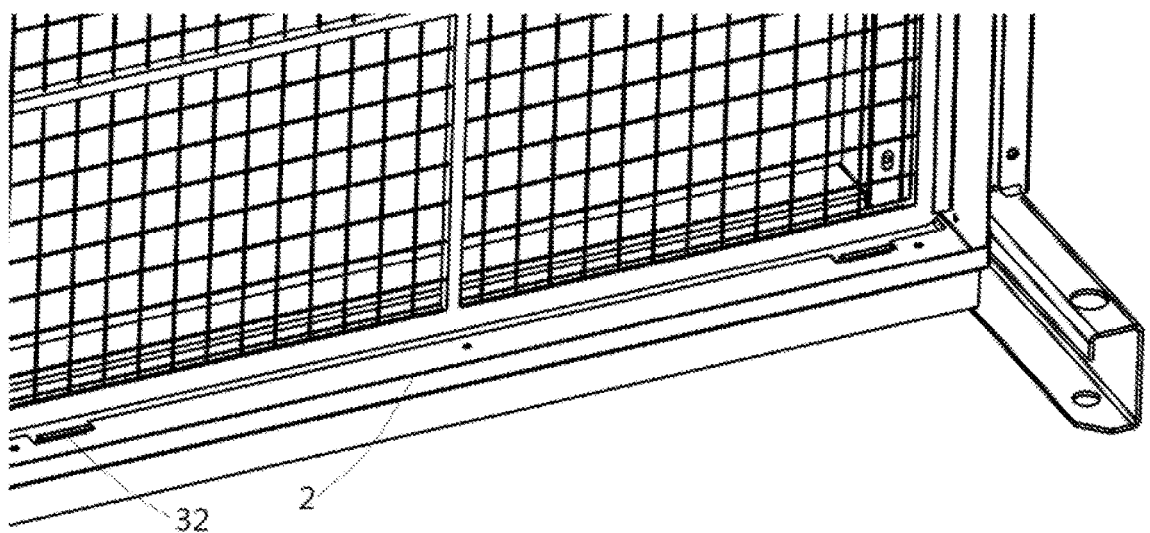
Figure 10:
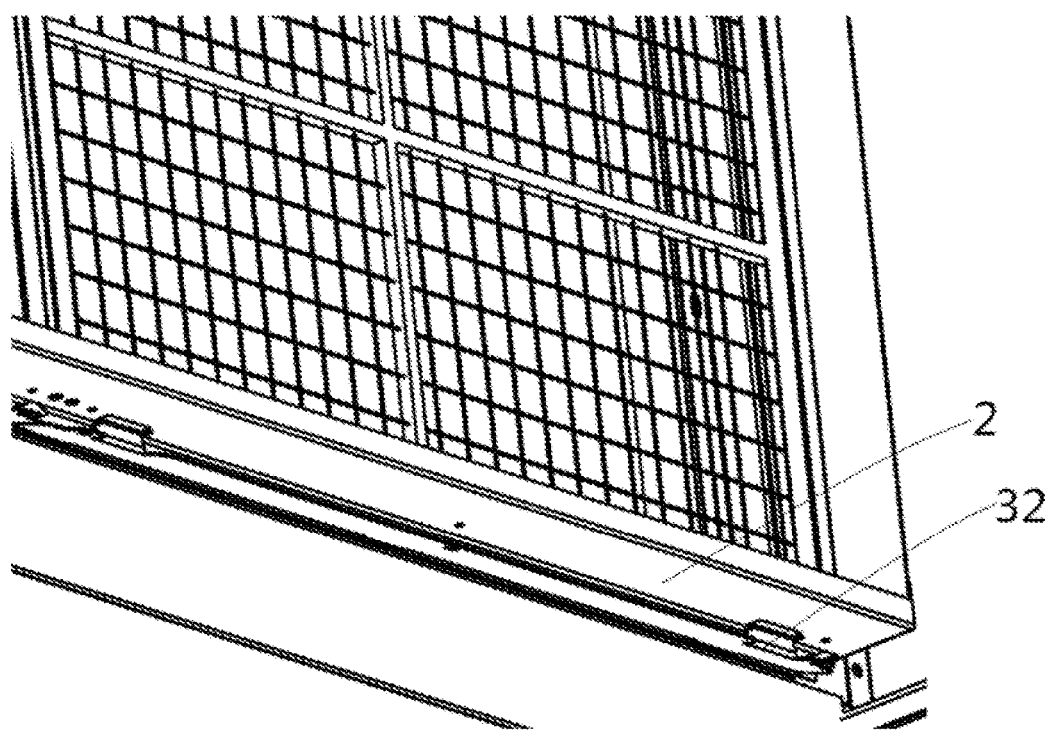
FIGS. 10 and 11 show, respectively, locally enlarged perspective views after translating from the states of FIGS. 8 and 9, when viewed from above and below.
Figure 11:
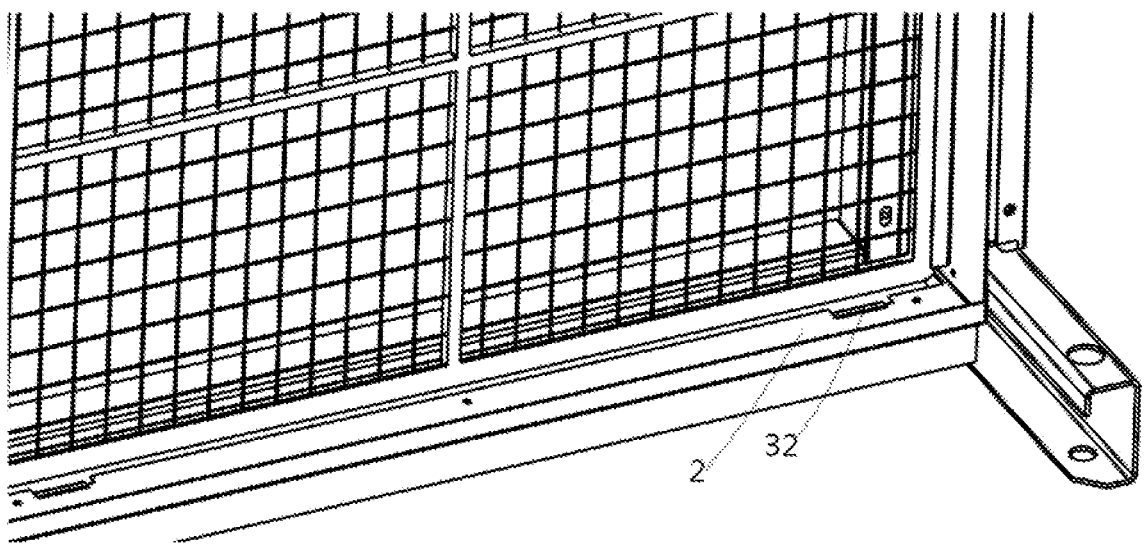
Figure 12:
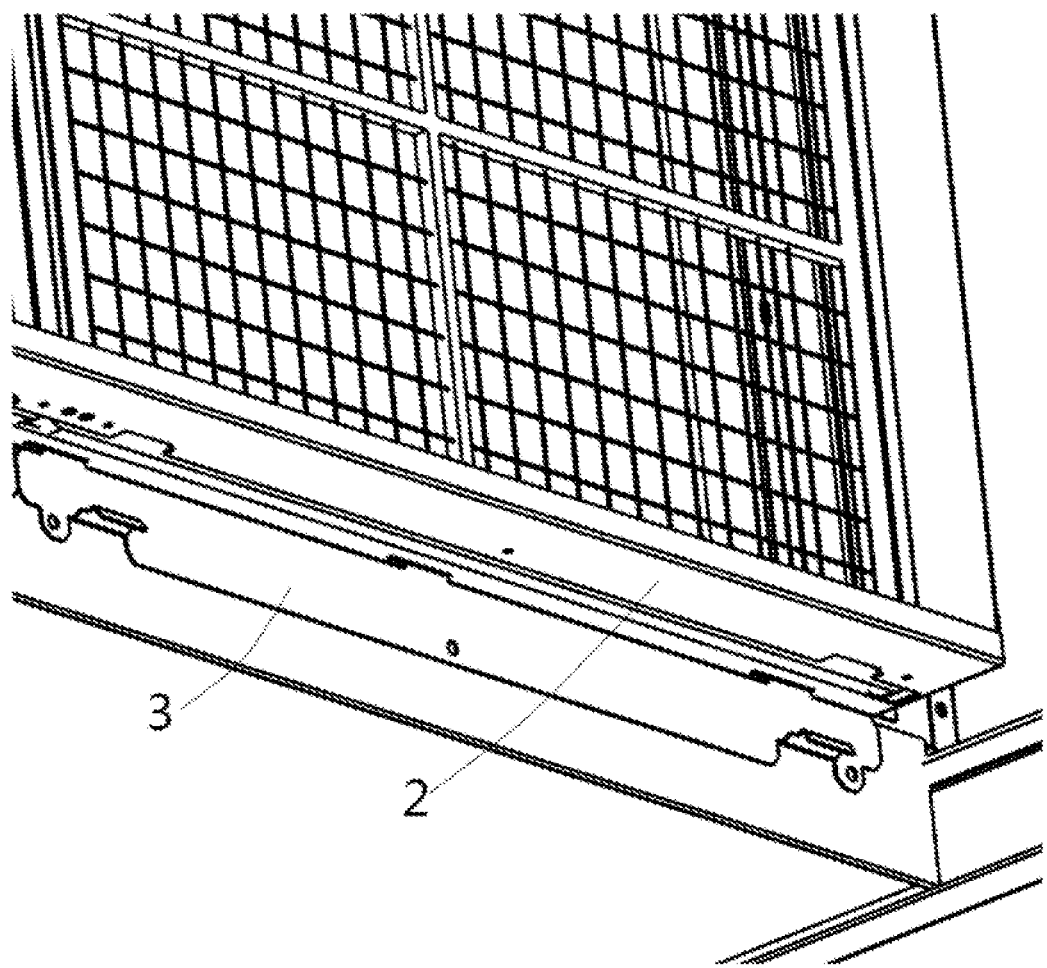
FIG. 12 shows a perspective view of a support plate for an air outlet according to an embodiment when viewed from below at a second angle position.

An air outlet and a filter screen supporting assembly therein according to an embodiment are described with reference to FIGS. 1 to 7. The air outlet comprises a housing 1, two filter screens 12, 13, and a filter screen supporting assembly located at the bottom of the filter screens. The filter screen supporting assembly comprises a substrate 2 shown in FIG. 6 and a support plate 3 shown in FIG. 5. The substrate 2 comprises a slot 20 allowing filter screens 12, 13 to pass through. In the embodiment shown, the single slot 20 corresponds to two filter screens 12, 13, and support plates 3, 3' are provided for the respective filter screen. In an alternative embodiment, a separate slot 20 or a separate substrate 2 may be provided for each filter screen, or a single support plate 3 may be provided for a plurality of filter screens. The support plate 3 comprises a first side 301 and a second side 302. The first side 301 of the support plate 3 is pivotally connected to the substrate 2 at a first side of the slot 20 of the substrate 2, and the second side 302 of the support plate 3 is detachably connected to the substrate 2 at a second side of the slot 20 of the substrate 2, so that the support plate 3 fills at least a part of the slot 20 of the substrate 2 to support the filter screen 12. In order to facilitate filter screen replacement, additional supporting piece is provided on the substrate 2 and/or the support plate 3. During the replacement of the filter screen, when the connection between the second side 302 of the support plate 3 and the substrate 2 is removed, the support plate 3 pivots around its connection to the first side of the slot on the substrate 2 to a first angle position (as shown in FIGS. 8 and 9) and is then supported by the additional supporting piece, so that the support plate 3 retains its support for the filter screen 12. And, at this point, the support from the additional supporting piece needs to be removed, so that the support plate 3 can continue to pivot to a second angle position (as shown in FIG. 12) to allow the filter screen 12 to pass through the slot 20, thereby replacing the filter screen. With the arrangement of pivotable connection at one side and the additional supporting piece, there is no need to worry about the falling of the filter screen when removing the connection at the second side.

In some embodiments, the second side 302 of the support plate 3 is detachably connected to the second side of the slot plate of the substrate 2 by a plurality of bolts distributed along the length direction. In this embodiment, the second side 302 of the support plate 3 is provided with three bolt holes 33 that are corresponding to three bolt holes 23 on the second side of the slot 20 of the substrate 2, so that the two can be secured by three bolts. As an alternative, a plurality of rotatable arms can be arranged along the length direction of the substrate, wherein the first ends of the plurality of rotatable arms can be rotatably fixed to the substrate 2, and the second ends of the plurality of rotatable arms can support the support plate 3, so that the second side 302 of the support plate 3 can be released by rotating the plurality of rotatable arms. As an alternative, a plurality of pins can be arranged along the length direction of the substrate, wherein the plurality of pins support the support plate 3, while the retraction of the plurality of pins releases the second side 302 of the support plate 3. As an alternative, the second side 302 of the support plate 3 can be detachably connected to the substrate 2 in any suitable manner, while bolts are used as examples in the embodiments of the present invention. According to the present invention, since only one side of the support plate 3 is detachably connected to the substrate 2, only the bolts or other connecting members on one side need to be removed when replacing the filter screen, which simplifies the removal operation.

In some embodiments, the additional supporting pieces are a plurality of hooks 32 formed along the length direction on the second side 302 of the support plate 3. When a plurality of bolts are removed in the scenario shown in FIGS. 1 to 4, the support plate 3 pivots to the first angle position shown in FIGS. 8 and 9. When the support plate is at the first angle position as shown in FIGS. 8 and 9, the plurality of hooks 32 contact and abut against the substrate 2 to support the support plate 3 at the first angle position. For example, the support plate 3 can pivot by an angle less than 60 degrees, such as 5 degrees, 15 degrees, 30 degrees, etc., to the first angle position. In an alternative embodiment, the support plate 3 can be supported directly by the additional supporting pieces, i.e., the support plate 3 does not pivot before the support from the additional supporting piece is removed. When the support plate 3 is at the first angle position or without pivoting, the filter screen will not fall down as the support plate 3 still supports the filter screen, thus making it easier and safer for the operator to disassemble. In this embodiment, the support plate 3 translates in the length direction, so that the plurality of hooks 32 are offset from the portions on the substrate 2 which were engaged with the hooks, thereby removing the support from the additional supporting piece to allow the support plate 3 to pivot further to the second angle position. In some embodiments, at the second position, the support plate 3 is naturally hanging to allow removal and installation of the filter screen. As the support plate 3 is placed in a hanging state when replacing the filter screen, on the one hand, there is no need to worry about falling of the support plate 3, and on the other hand, it is also easier to re-install the filter screen. In an alternative embodiment, the support plate 3 may be immovable (e.g., when pivotally connected via a hinge), at which point the plurality of hooks 32 on the support plate 3 are movable, where the plurality of hooks 32 may translate or rotate independently or collaboratively relative to the support plate 3, thereby releasing the support plate 3 to allow it to pivot to the second angle position. Alternatively, the portions on the substrate 2 which support the plurality of hooks 32 are movable or removable, thereby releasing the support plate.

As an alternative, a plurality of hooks can be provided on the substrate 2 and, when the support plate 3 pivots to the first angle position, the plurality of hooks or blocks on the substrate 2 support the edge of the second side 302 of the support plate 3 or both ends of the support plate 3 along the length direction. In such an embodiment, the support plate 3 can be released by removing the support from the plurality of hooks or blocks to the support plate 3, so that the support plate 3 continues to pivot to the second angle position. This release can be achieved, for example, by translating the support plate 3 to force the plurality of hooks on the substrate 2 to move (such as translate or rotate). As an alternative, a plurality of chains or ropes can be arranged between the substrate 2 and the support plate 3, so that when the support plate 3 pivots to the first angle position, the plurality of chains or ropes are straightened to carry the support plate 3. In such an embodiment, one end or the middle of the plurality of chains may be a hook-to-ring connection, and the support plate 3 can be released by separating the hook and the ring so that it continues to pivot to the second angle position.

Figure 1:
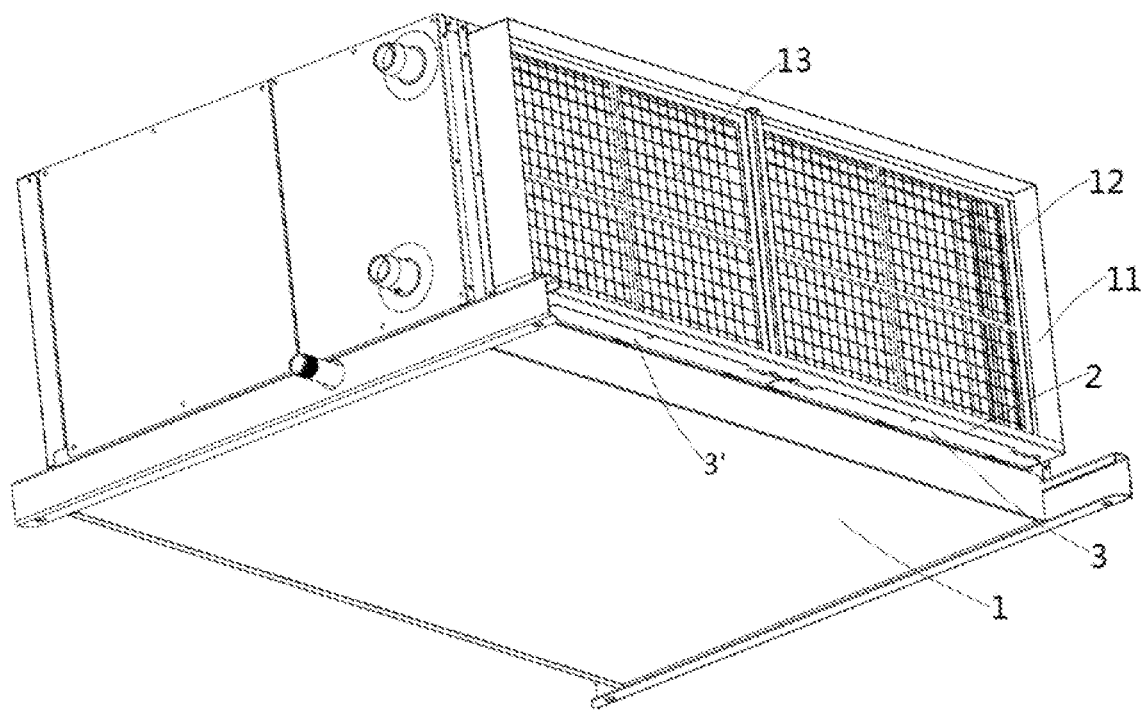
FIGS. 1 and 2 show, respectively, perspective views of the support plate of the air outlet according to an embodiment when viewed from above and below in an assembled state.
Figure 2:
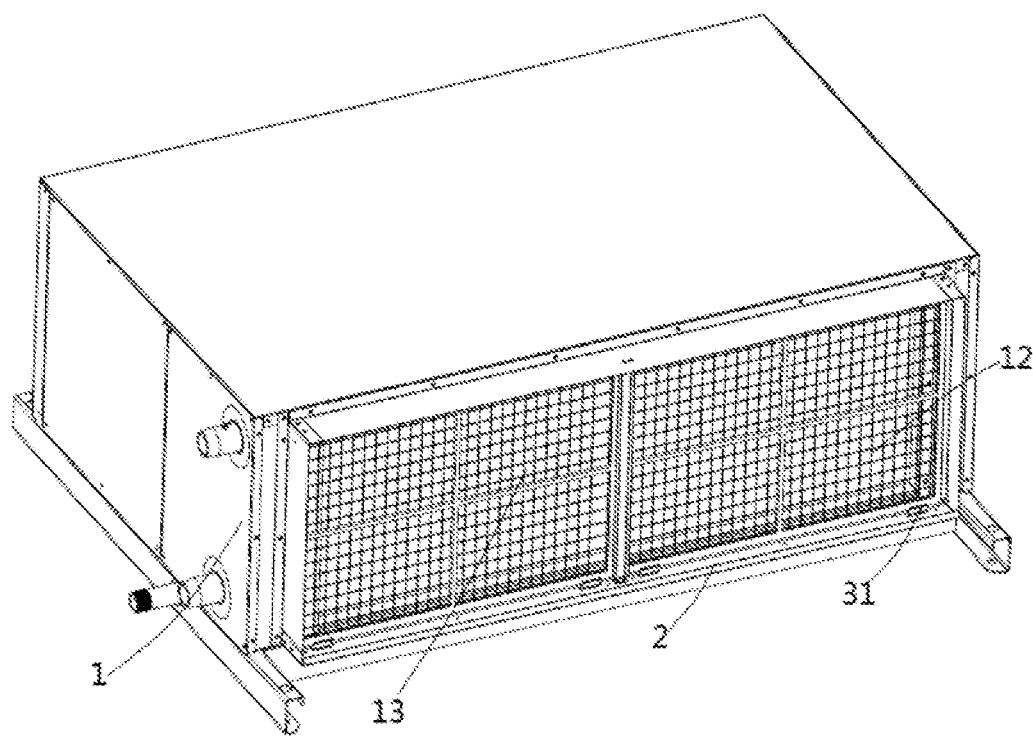
Figure 3:
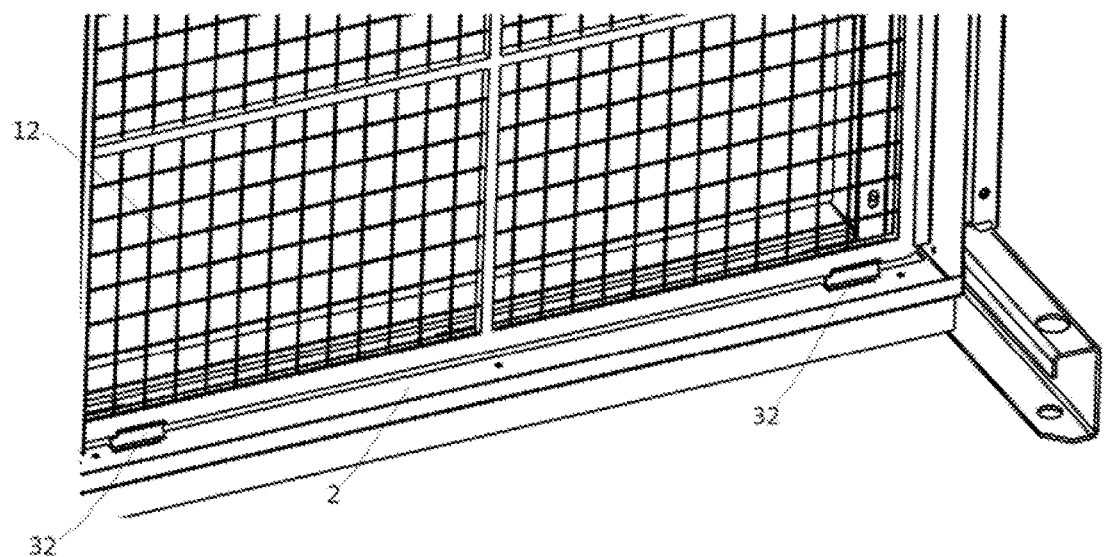
FIGS. 3 and 4 are locally enlarged views of FIGS. 1 and 2, respectively.
Figure 4:
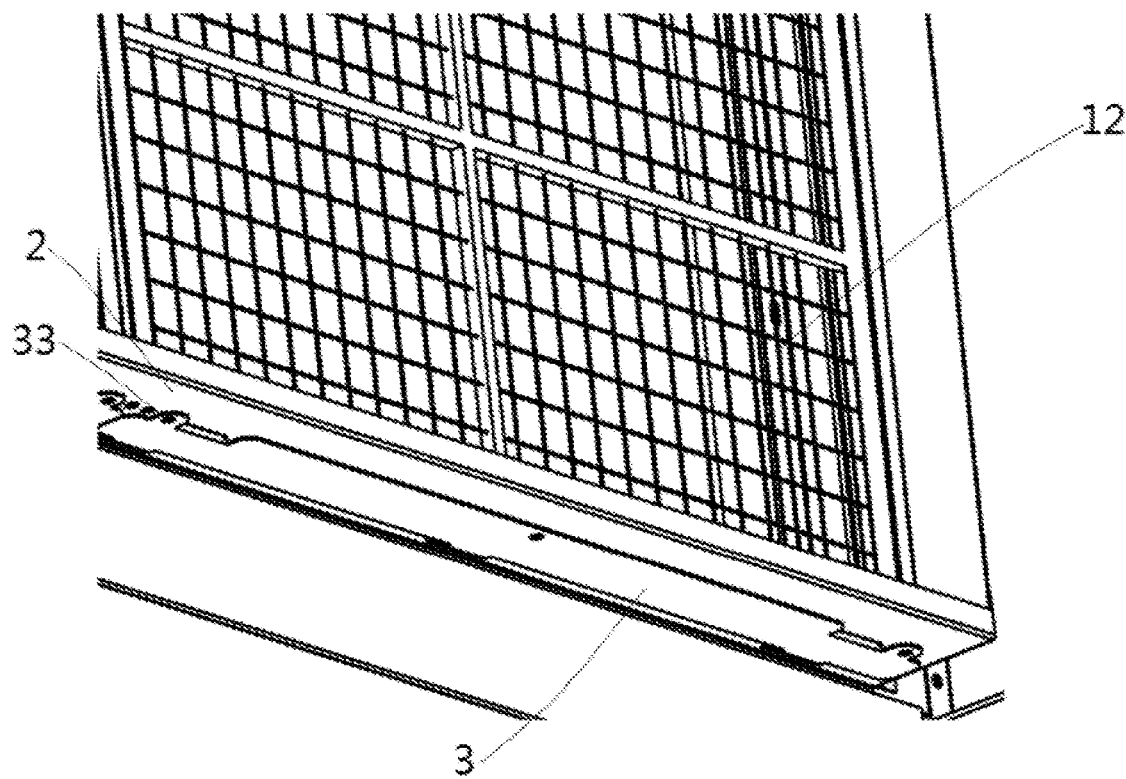
Figure 5:
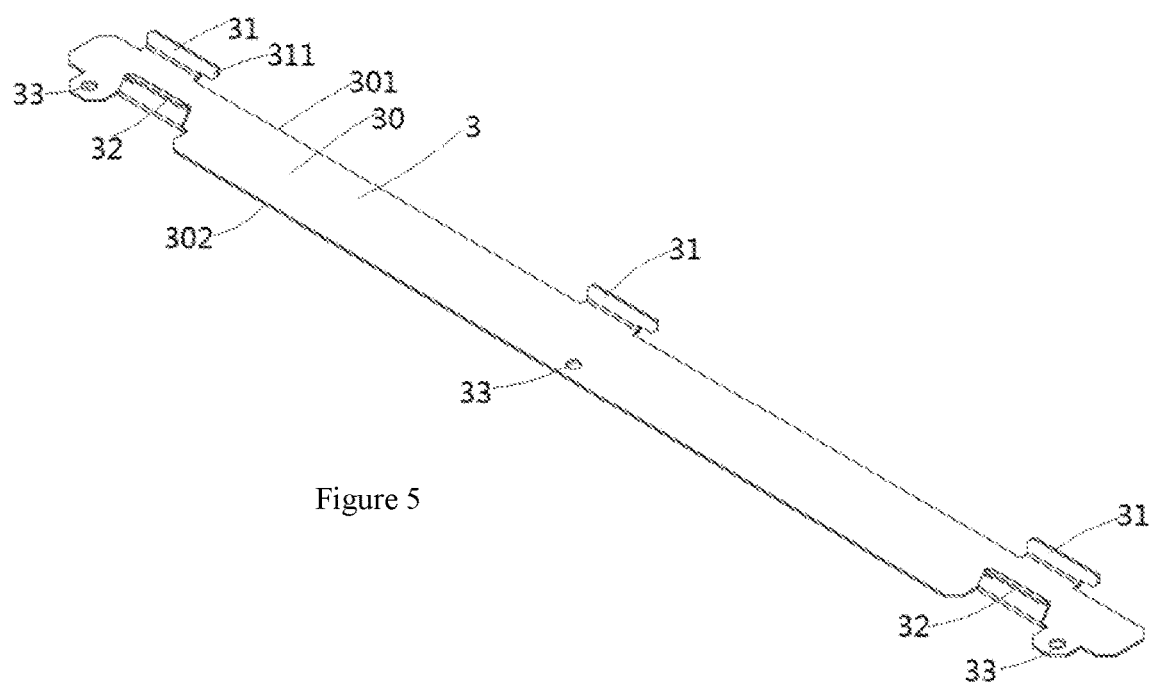
FIG. 5 shows a perspective view of the support plate according to an embodiment when viewed from above.
Figure 6:
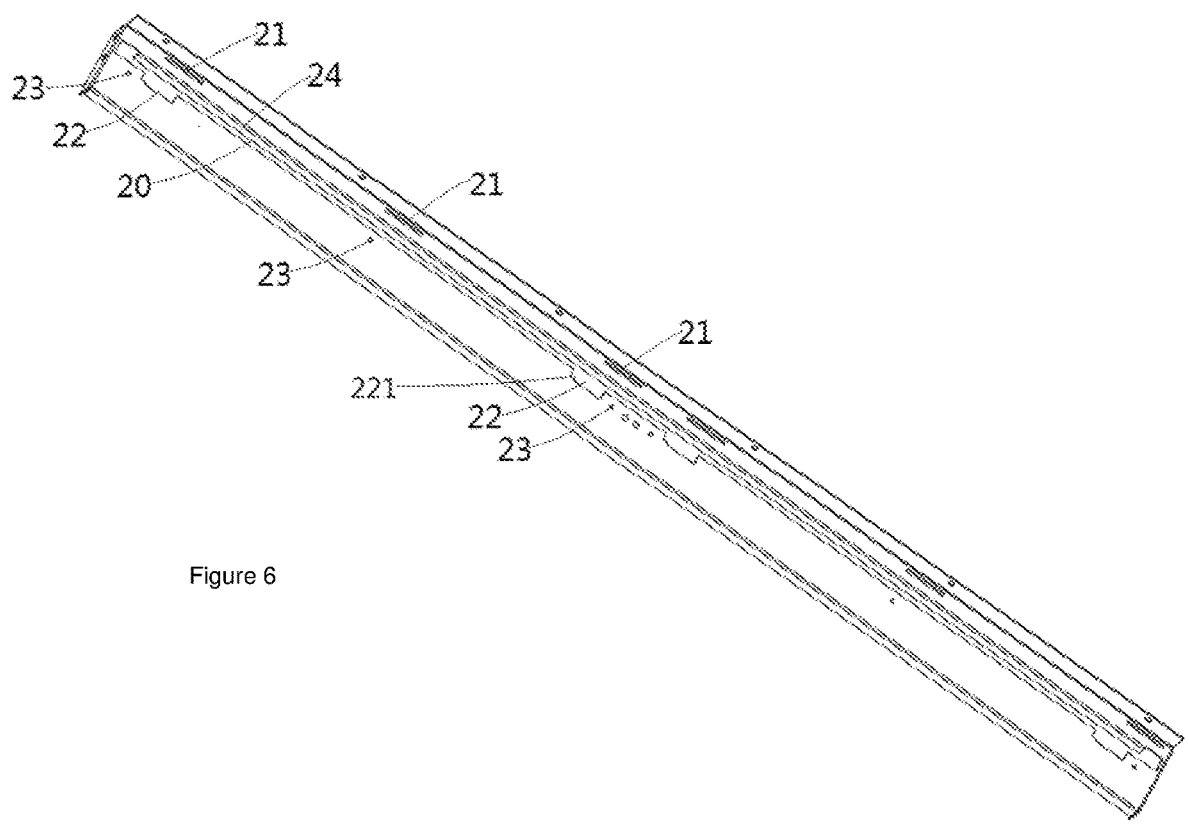
FIG. 6 shows a perspective view of the substrate according to an embodiment when viewed from below.

As shown in FIGS. 5 and 6, the support plate 3 comprises a support plate body 30, wherein a plurality of hooks 32, which are formed by bending twice, are formed on the second side of the support plate body 30, and a plurality of protrusions 31 perpendicular to the support plate body are formed on the first side of the support plate body 30, where the plurality of protrusions 31 can be formed by stamping and bending to have transverse extensions 311 extending along the length direction. The substrate comprises a series of openings 22 corresponding to the plurality of hooks 32 on the second side of the slot 20 and a series of notches 21 corresponding to the plurality of protrusions 31 on the first side of the slot to allow the support plate 3 to be inserted into the substrate 2 vertically from the bottom up and to be translated along the length direction to an assembled state as illustrated in FIG. 7, so that the transverse extensions 311 of the plurality of protrusions 31 are offset from the series of notches 21 so as to be supported by the substrate 2. In addition, the plurality of hooks are aligned with the block corners 221 of the series of openings such that when the support plate 3 is supported at the first angle position, the block corners 221 of the substrate 2 are in contact with the plurality of hooks 32 to provide support. In this structure, the support plate 3 can only be assembled to or disassembled from the substrate 2 when its body 30 is in a horizontal orientation, while the support plate 3 cannot be separated from the substrate 2 at the first and second angle positions. Through this arrangement, the substrate 2 and the support plate 3 are connected only by a plurality of bolts on the second side of the support plate 3, while there is no fixed connection on the first side of the support plate 3, which makes the assembly of the support plate 3 particularly convenient. In addition, the support plate 3 does not need to be dismounted entirely in the process of filter screen replacement, which facilitates subsequent installation. In an alternative embodiment, the first side 301 of the support plate can be pivotally connected to the substrate 2 by hinges. As an alternative, the first side 301 of the support plate can be pivotally connected to the substrate 2 by pins, in which case the support plate 3 can also be arranged to translate relative to the substrate 2.

As shown in FIG. 7, a limit protrusion 24 is provided at the first side of the slot 20 of the substrate 2 on the surface opposite to the support plate 3 to limit the filter screen on the first side of the filter screen. When the support plate is assembled in place, the plurality of hooks 32 limit the filter screen on the second side of the filter screen, thereby limiting the movement of the filter screen by means of the substrate and the support plate in an assembled state.

An air conditioning system is further provided, wherein a filter screen and a filter screen supporting assembly according to the various embodiments are configured in the air outlet or ventilation duct of the air conditioning system.

The specific embodiments of the present application described above are merely intended to describe the principles of the present application more clearly, where various components are clearly shown or described to facilitate the understanding of the principles of the present invention. Those skilled in the art may, without departing from the scope of the present application, make various modifications or changes to the present application. Therefore, it should be understood that these modifications or changes should be included within the scope of patent protection of the present application.

What is claimed is:

1. A filter screen supporting assembly, comprising:
   a substrate having a slot allowing a filter screen to pass through; and
   a support plate having a first side and a second side, wherein the first side of the support plate is pivotally connected to the substrate at a first side of the slot of the substrate, and the second side of the support plate is detachably connected to the substrate at a second side of the slot of the substrate, so that the support plate fills at least a part of the slot of the substrate to support the filter screen;
   wherein, the substrate and/or the support plate are provided with additional supporting piece, such that after the connection between the second side of the support plate and the substrate is removed during the replacement of the filter screen, the support plate is supported by the additional supporting piece so that the support plate retains its support for the filter screen, and after the support from the additional supporting piece is removed, the support plate pivots to allow the filter screen to pass through the slot.

2. The filter screen supporting assembly according to claim 1, wherein the second side of the support plate is detachably connected to the second side of the slot of the substrate through a plurality of bolts distributed along a length direction.

3. The filter screen supporting assembly according to claim 1, wherein after the connection between the second side of the support plate and the substrate is removed, the support plate pivots around its connection to the first side of the slot of the substrate to a first angle position to be supported by the additional supporting piece, such that the support plate retains its support for the filter screen, and after the support from the additional supporting piece is removed, the support plate continues to pivot to a second angle position to allow the filter screen to pass through the slot.

4. The filter screen supporting assembly according to claim 3, wherein the additional supporting pieces are a plurality of hooks distributed along a length direction on the second side of the support plate, wherein when the support plate is at the first angle position, the plurality of hooks contact and abut against the substrate to support the support plate at the first angle position, where the support plate pivots by an angle of less than 60 degrees to the first position.

5. The filter screen supporting assembly according to claim 4, wherein the support plate is capable of translating in the length direction, such that the plurality of hooks are offset from the portions on the substrate that are engaged with the plurality of hooks, thereby removing the support from the additional supporting piece to allow the support plate to pivot to a second angle position, where the support plate is naturally hanging at the second angle position.

6. The filter screen supporting assembly according to claim 4, wherein the support plate comprises a support plate body, where the plurality of hooks that are formed by bending twice are formed on a second side of the support plate body, and a plurality of protrusion perpendicular to the support plate body are formed on a first side of the support plate body, the plurality of protrusion having transverse extensions extending in the length direction; and the substrate comprises a series of openings corresponding to the plurality of hooks on the second side of the slot and a series of notches corresponding to the plurality of protrusion on the first side of the slot to allow the support plate to be inserted into the substrate vertically from the bottom up and to be translated in the length direction, so that the transverse extensions of the plurality of protrusion are offset from the series of notches so as to be supported by the substrate, and the plurality of hooks are no longer aligned with the series of openings such that the substrate are in contact with the plurality of hooks when the support plate is at the first angle position.

7. The filter screen supporting assembly according to claim 4, wherein the substrate has a limit protrusion at the first side of the slot on a surface opposite to the support plate to limit the filter screen on a first side of the filter screen, and the plurality of hooks limit the filter screen on a second side of the filter screen when the support plate is assembled in place.

8. The filter screen supporting assembly according to claim 1, wherein the first side of the support plate is pivotally connected to the substrate by hinges or pins.

9. The filter screen supporting assembly according to claim 1, wherein the additional supporting pieces are a plurality of hooks formed on the substrate or a plurality of chains or ropes formed between the substrate and the support plate.

10. An air conditioning system, wherein a filter screen and a filter screen supporting assembly according to claim 1 are provided in the air outlet or ventilation duct of the air conditioning system.

* * * * *